O. W. HULT.
BALANCING DEVICE FOR EXPLOSION OR INTERNAL COMBUSTION MOTORS.
APPLICATION FILED MAR 27, 1920.
1,393,782.
Patented Oct. 18, 1921.
2 SHEETS—SHEET 1.
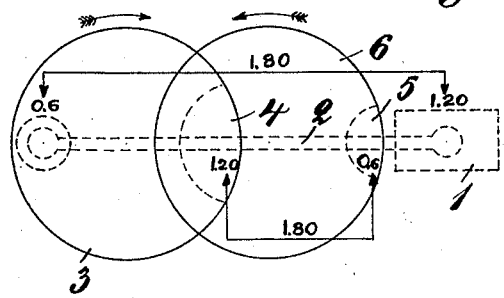
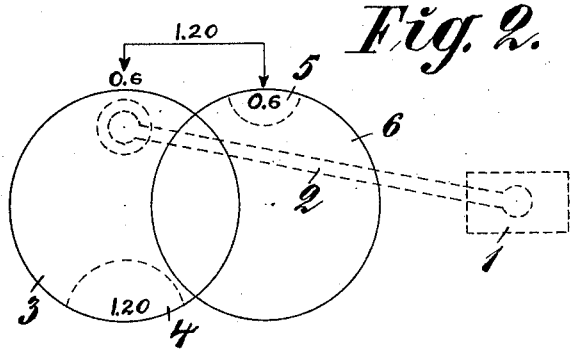
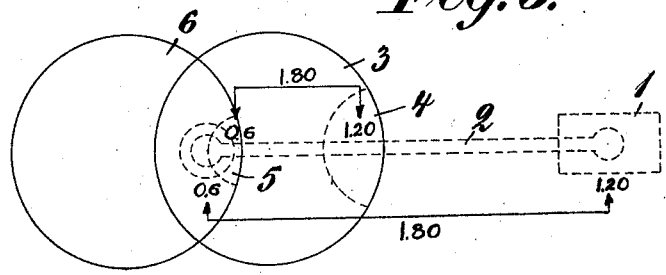
Inventor
O. W. Hult
By H. R. Kerslake
Atty O. W. HULT.
BALANCING DEVICE FOR EXPLOSION OR INTERNAL COMBUSTION MOTORS.
APPLICATION FILED MAR. 27, 1920.

1,393,782.  Patented Oct. 18, 1921.

Inventor
O. W. Hult.
By H. R. Kerslake
Atty

UNITED STATES PATENT OFFICE.

OSCAR WALFRID HULT, OF STOCKHOLM, SWEDEN.

BALANCING DEVICE FOR EXPLOSION OR INTERNAL-COMBUSTION MOTORS.

1,393,782. Specification of Letters Patent. Patented Oct. 18, 1921.

Application filed March 27, 1920. Serial No. 369,356.

*To all whom it may concern:*

Be it known that I, OSCAR WALFRID HULT, a subject of the King of Sweden, and resident of 1 Inedalsgatan, Stockholm, in the Kingdom of Sweden, mechanical engineer, have invented certain new and useful Improvements in Balancing Devices for Explosion or Internal-Combustion Motors, of which the following is a specification, reference being made to the accompanying drawings.

The present invention relates to such single-cylinder (or others in themselves unbalanced) explosion or internal combustion motors as are provided with a balance weight, and in which the ignition of the motive charges is made by means of a magneto-electric ignition apparatus having a rotating main part. In accordance with the present invention the balance weight is arranged on, or placed in, the rotating part of the ignition apparatus. The desired balancing of the motor is hereby attained in a simple manner.

Figure 4:
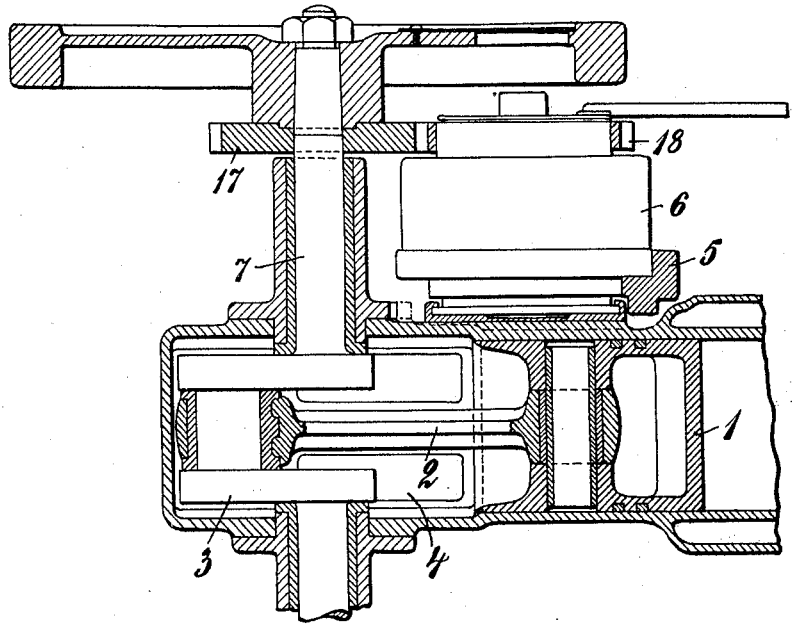
Figure 5:
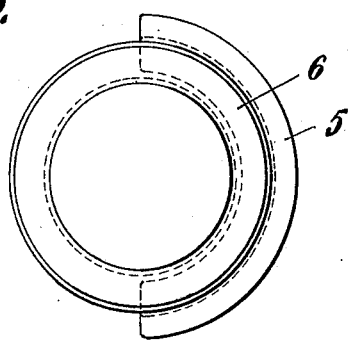

In the accompanying drawings Figures 1, 2 and 3 are diagrams which serve to make plain this invention, while Fig. 4 shows a form of the invention in section. Fig. 5 illustrates in plan, an ignition apparatus appertaining to the motor shown in Fig. 4.

The invention should be most easily understood with the aid of the diagrams in Figs. 1 and 2. In these figures—as also in the other figures—1 designates the piston of a motor, 2 its connecting rod, 3 its crank (crank disk), 4 a balance weight arranged on it, as is usual, and 5 a balance weight which is arranged on, or is placed in, the part 6 of the main parts of a magneto-electric ignition apparatus, which part rotates in an opposite direction to, and with the same angular velocity as the said shaft. With regard to the weight of the parts 1 to 5 it is assumed that the piston 1 and the part of the connecting rod situated toward it weigh 1.20 kilograms, the crank 3 and the part of the connecting rod situated toward it 0.60 kg. the balance weight 4 1.20 kg. and the balance weight 5 0.60 kg.

At an examination of the diagrams in Figs. 1 and 2 corresponding to one another it will be found (see Fig. 1) that when the piston turns at one of its extreme positions, the masses (the piston, the connecting rod and the crank) which then (*i. e.* immediately before the turn) move toward the left, are equal in weight (1.80 kg.) to the masses (the two balance weights) moving simultaneously to the right. Thus at this moment a balancing of the movable parts of the motor is attained. Obviously the same result is attained when the piston turns at its other extreme position. In practice, not merely the weights of the movable parts, but also their radii of rotation must evidently be so adjusted that this balancing—as well as the balancing referred to in the sequel—is attained (wholly or partially).

When the motor shaft has turned at an angle of ninety degrees from the position corresponding to the extreme position of the piston, shown in Fig. 1, and the piston is thus approximately midway between its two extreme positions, at which time the weight thereof and of the part of the connecting rod situated toward it can now be left out of account, the balance weight 5, owing to the fact that it rotates in an opposite direction to the motor shaft and with the same angular velocity as the latter, as also the crank pin which is acted upon by the part of the connecting rod situated toward the crank, are in a position which is diametrical to the position of the balance weight 4. Inasmuch as the weights turning at this moment and diametrically situated are equal in weight (1.20 kg), balancing of the motor is attained also at that moment. The same is obviously also the case when the motor shaft has turned at an angle of ninety degrees from the position corresponding to the other extreme position of the piston.

According to Figs. 1 and 2, the ignition apparatus is situated on the same side of the motor shaft as the motor cylinder or the piston. According to the diagram shown in Fig. 3, the ignition apparatus may instead be on the other side of the said shaft. As is readily understood, balancing of the motor is attained in this case also on the passage of the movable parts through the four positions of turn.

By placing the balance weight 5 in accordance with Figs. 1 and 2, *i. e.* on the same side of the motor shaft as the piston, there is, however, attained the advantage that the balance weight counteracts the lateral pressure exerted by the piston on the cylinder during its working stroke.

The arrangement shown in Fig. 4 is constructed in accordance with the diagrams in Figs. 1 and 2, *i. e.* the balance weight 5 is placed on the part 6 of the magneto-electric ignition apparatus of the explosion or internal combustion motor, which part 6 (which may belong to the magnet part of the ignition apparatus) rotates in an opposite direction of the motor shaft and with the same angular velocity as the latter and is arranged on the same side of the motor shaft as the piston. On the motor shaft 7 is mounted a toothed wheel 17, which meshes with a toothed ring 18 fixed on the part 6, so that the balance weight is caused to rotate in the manner indicated.

This arrangement may be modified in accordance with Fig. 3, i. e., in such wise that the ignition apparatus, instead of being situated—as shown in Figs. 1, 2 and 4—on the same side of the motor shaft as the motor cylinder, is placed on the other side of the said shaft. Hereby is attained the result that the balance weight 5 can be placed in the same plane as the center line of the motor, which is to the advantage of the balancing.

With a view to as effective a balancing of the motor as possible, it is expedient in the arrangement shown in Figs. 1, 2 and 4 to place the balancing weight as close to the center line of the motor as possible. In order to render this possible, the wall of the crank casing of the motor to which the balance weight is adjacent, may be situated farther in toward the center line of the motor than the opposite crank casing wall. In order to attain such a position of the first-mentioned wall, i. e., in order to obtain the desired position of the balance weight 5, the crank of the motor may be displaced (in a direction from the said weight) in relation to the center line of the motor.

Balancing devices made in accordance with the present invention, which can be applied to other motors, unbalanced in themselves, than single-cylinder motors, may be of a different nature than those indicated by way of example. Thus, for instance, instead of one balance weight 5 there may be two or more corresponding balance weights, so arranged that they act in all positions in diametrically opposite directions in relation to the center line of the motor shaft, whereby the balancing effect will be the greatest possible.

Having now described my invention, what I claim as new and desire to secure by Letters Patent is:

1. The combination with an engine having a rotatable crank shaft, of an ignition apparatus including a rotatable part, said rotatable part including a balance weight which rotates in an opposite direction to and with the same angle of velocity as the engine shaft.

2. A combination of the kind defined by claim 1 in which the balance weight forming part of the ignition apparatus is arranged on the same side of the motor shaft as the piston of the engine.

3. A combination of the kind defined by claim 1 in which the balance weight forming part of the ignition apparatus is arranged in close proximity to the center line of the motor cylinder.

4. The combination with an internal combustion engine including a cylinder, a piston, a crank shaft and a connecting rod arranged between the crank shaft and the piston, of an ignition apparatus arranged adjacent to the crank shaft and having a rotating part whose axis is arranged parallel to the axis of the crank shaft, means connecting the rotating part of the ignition apparatus to the crank shaft for driving said rotating part from the crank shaft, a balance weight for the crank shaft, and a balance weight included in the rotating part of the ignition apparatus.

In witness whereof I have hereunto set my hand in presence of two witnesses.

OSCAR WALFRID HULT.

Witnesses:
 H. P. OBESSON,
 L. NEOLIN.